(12) United States Patent
Hamman et al.

(10) Patent No.: US 11,429,513 B1
(45) Date of Patent: Aug. 30, 2022

(54) TESTING AND VERIFYING CLOUD SERVICES USING A COMPUTATIONAL GRAPH

(71) Applicant: Amazon Technologies, Inc., Seattle, WA (US)

(72) Inventors: Richard Hamman, Cape Town (ZA); Kevin Pakiry, Cape Town (ZA); Gareth Lennox, Cape Town (ZA); Fernand Sieber, Cape Town (ZA); Thomas George Mathew, Cape Town (ZA); Pavel Tcholakov, Cape Town (ZA); Graeme Kruger, Cape Town (ZA); Bhavani Morarjee, Cape Town (ZA); Tarek Khaled Ismail Eltalawy, Alexandria, VA (US); Sara Mohamed Ali, Alexandria, VA (US); Paul Maree, Cape Town (ZA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/913,978

(22) Filed: Jun. 26, 2020

(51) Int. Cl.
*G06F 11/36* (2006.01)
*G06F 16/901* (2019.01)
(Continued)

(52) U.S. Cl.
CPC ........ *G06F 11/3684* (2013.01); *G06F 9/5072* (2013.01); *G06F 9/547* (2013.01);
(Continued)

(58) Field of Classification Search
CPC ............. G06F 11/3688; G06F 11/3664; G06F 11/0712; G06F 11/0769; G06F 11/0772; G06F 11/3684; G06F 16/9024; G06F 9/5072; G06F 9/547; G06F 21/577; H04L 67/40

See application file for complete search history.

(56) References Cited

U.S. PATENT DOCUMENTS

2005/0166115 A1* 7/2005 Daume ............... G06F 11/3447
714/741
2010/0287534 A1* 11/2010 Vangala .............. G06F 11/3612
717/124

(Continued)

OTHER PUBLICATIONS

Ammar ahmed E. Elhadi et al.; Improving the Detection of Malware Behaviour Using Simplified Data Dependent API Call Graph; SERSC; pp. 29-42; retrieved on Apr. 13, 2022. (Year: 2013).*

(Continued)

*Primary Examiner* — S. Sough
*Assistant Examiner* — Cuong V Luu
(74) *Attorney, Agent, or Firm* — Thomas Horstemeyer, LLP

(57) ABSTRACT

Various embodiments for testing and verifying cloud services using computational graphs. In one embodiment, a computational graph is generated that represents corresponding actions performed by a plurality of agents and data associated with the corresponding actions. The computational graph is generated based at least in part on data describing a plurality of calls to an application programming interface (API) or a static analysis of the API. A plurality of test cases are generated for the API by analyzing the computational graph.

18 Claims, 7 Drawing Sheets

(51) Int. Cl.
*H04L 29/06* (2006.01)
*G06F 21/57* (2013.01)
*G06F 9/54* (2006.01)
*G06F 9/50* (2006.01)
*H04L 67/133* (2022.01)

(52) U.S. Cl.
CPC ........ *G06F 16/9024* (2019.01); *G06F 21/577* (2013.01); *H04L 67/40* (2013.01)

(56) References Cited

U.S. PATENT DOCUMENTS

| | | | |
|---|---|---|---|
| 2015/0121401 A1* | 4/2015 | Laredo | G06F 9/54 719/328 |
| 2018/0113799 A1* | 4/2018 | M.V. | G06F 11/3684 |
| 2018/0260314 A1* | 9/2018 | Singi | G06F 16/9024 |
| 2020/0349063 A1* | 11/2020 | Brebner | G06F 11/3664 |
| 2021/0133089 A1* | 5/2021 | Khillar | G06F 11/3692 |

OTHER PUBLICATIONS

Evan Moritz et al.; ExPort Detecting and Visualizing API Usages in Large Source Code Repositories; IEEE; pp. 646-651; retrieved on Apr. 13, 2022. (Year: 2013).*

U.S. Appl. No. 16/913,997, entitled "Managing Access To Aggregated Descriptive Data for Cloud Services," and filed on Jun. 26, 2020. Copy not provided.

U.S. Appl. No. 16/913,993, entitled "Replicating and Managing Aggregated Descriptive Data for Cloud Services," and filed on Jun. 26, 2020. Copy not provided.

* cited by examiner

TESTING AND VERIFYING CLOUD SERVICES USING A COMPUTATIONAL GRAPH

BACKGROUND

A cloud provider network may offer a variety of computing resources that customers can provision on demand. To this end, the cloud provider network may support an application programming interface (API) that receives commands to allocate machine instances, application execution environments, applications, databases, and/or other forms of computing resources on behalf of a customer. The cloud provider network may also support an API for customers to query which computing resources are allocated on their behalf and the current status of those computing resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
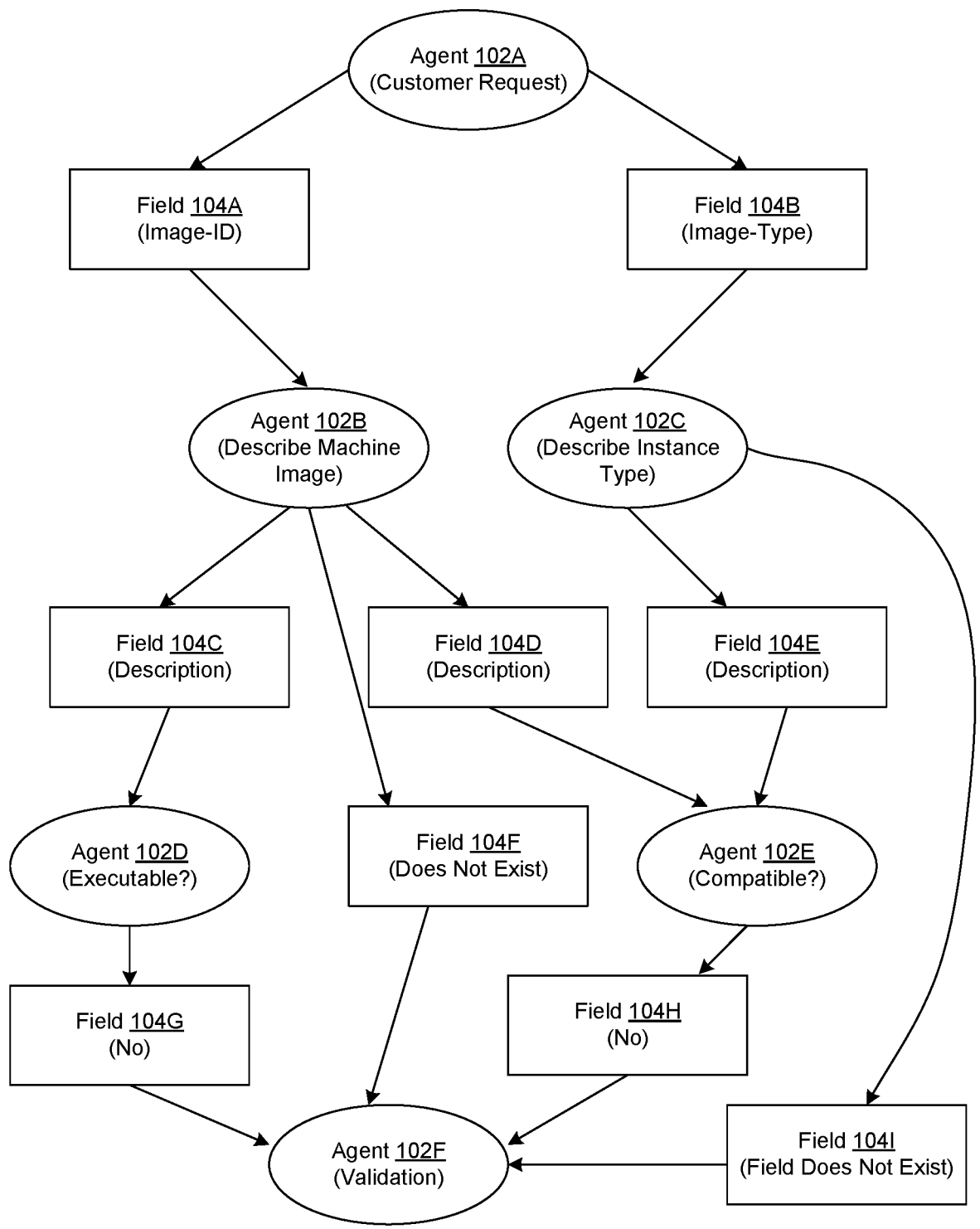
FIG. 1 is a drawing of an example of a computational graph resulting from the compilation of input constraints according to various embodiments of the present disclosure.

The present disclosure relates to testing and verifying cloud services using a computational graph. A cloud provider network may offer a variety of different types of computing resources as a service. These computing resources may include, for example, physical machine instances, virtual machine instances, application execution environments, hosted applications, database systems, and so on. Rather than maintaining their own hardware servers on site or in a co-location facility, customers are able to dynamically allocate resources via the cloud provider network, while the cloud provider network manages the underlying hardware.

As customers rely upon the cloud provider network to manage these computing resources, the cloud provider network may provide an application programming interface for customers to use to describe their currently allocated computing resources and to determine current status and/or system health information for each of the computing resources. Various services may be provided in the cloud provider network to respond to these descriptive information requests. These services may be executed in backend computing systems strategically positioned in the cloud provider network to have access to the descriptive information. However, by virtue of their location in the cloud provider network, these backend computing systems may be susceptible to overloading from customer-driven descriptive information requests. Further, load imposed by customer-driven descriptive information requests on these systems could potentially interfere with servicing requests that implement changes to computing resources and consequently the descriptive information.

One example of a cloud service is an aggregated descriptive data service that provides a durable cache or view of data that is stored in various backend computing systems. The aggregated descriptive data service is used to serve non-mutating customer requests for descriptive information about their computing resources in the cloud provider network. The aggregated descriptive data service is kept up to date by way of an event stream from the backend computing system sources. As customer requests are directed to the aggregated descriptive data service instead of directly to the various backend computing systems, the load upon the backend computing systems becomes stabilized and predictable.

In deploying the aggregated descriptive data service and/or other cloud services, it may be desirable to test the aggregated descriptive data service against the backend sources to verify that calls to the aggregated descriptive data service will be consistent with the backend sources. As will be described, a computational graph may be automatically generated to represent application programming interface (API) calls. This computational graph may be analyzed to automatically infer test cases for the APIs in the cloud provider network. In addition, for a given API, various properties modelled in the computational graph may be verified. Such properties may include inter-customer isolation, that groupings of computing resources fail independently of other groupings of computing resources, and/or other properties.

With reference to FIG. 1, shown is an example of a computational graph 100 resulting from the compilation of input constraints according to some embodiments. The ovals in the computational graph 100 represent nodes that correspond to "agents" used to perform associated service API operations and the rectangles represent data fields resulting from execution of agents. As described above, the agents may be indicated in the input constraints and the flow of data from agent to agent may be determined based at least in part on automated analysis of the associated input and output fields. In some embodiments, an order of execution of the agents may not be indicated in the input recipe and the agents may be automatically arranged in the various paths as shown in the computational graph 100.

For example, it may be automatically determined that two operations are connected in the graph if one operation produces a particular field as an output and another operation consumes that same field as an input. The flow of data in the computational graph 100 may represent one or more potential execution orders; an actual execution order may be determined for a particular request at runtime. In some embodiments, a developer of the corresponding recipe may specify manual overrides to the bindings among the agents based on field relationships.

The field nodes in the computational graph 100 (for example, fields 104A-104H) may correspond to the fields in a sheet corresponding the request. In the computational graph 100, the top-level node 102A represents an incoming customer request, such as a request for an operation to describe a machine image type. The node 102A may provide the fields image-id 104A and instance-type 104B to other agents that are invoked. The agent 102B used to describe a machine image may take the image-id field 104A as input. The agent 102C used to describe an instance type may take the instance-type field 104B as input.

The describe machine image agent 102B may produce a description field 104C as input to an agent 102D that determines whether the machine image is executable. The describe machine image agent 102B may also provide the description field 104D as input to an agent 102E that determines whether the machine image is compatible. The describe instance type agent 102C produces its own description field 104E as input to the agent 102E that determines whether the machine image is compatible. If the machine image does not exist, the agent 102B provides such an indication 104F to a validation agent 102F. Similarly, if the instance type does not exist, the agent 102C provides such an indication 104I to the validation agent 102F. If the machine image is not executable, then the agent 102D provides such an indication 104G to the validation agent 102F. If the machine image or instance type is not compatible, then the agent 102E may provide such an indication 104H to the validation agent 102F.

Accordingly, in the computational graph 100, the agent 102E may take input fields from two upstream service agents 102B and 102C. From request to request, the agents 102B and 102C may vary in terms of how long they take to complete and when they produce their respective output fields. As indicated above, the order in which nodes of the computational graph 100 are traversed may vary from request to request, and the execution order may be determined at runtime based on the computational graph 100 itself, but also based on the order in which fields become available. For example, in some cases the agent 102D may be invoked while the agent 102E remains waiting for the description 104E produced by the agent 102C. In other cases, when the description 104E is ready before the description 104C, the agent 102E may be invoked before or around the same time as the agent 102D. Different paths in the computational graph 100 may also be traversed in parallel.

Generation of computational graphs is discussed in U.S. patent application Ser. No. 16/580,265, entitled "USER-CUSTOMIZABLE APPLICATION PROGRAMMING INTERFACES IN A PROVIDER NETWORK," and filed on Sep. 14, 2019, which is incorporated herein by reference in its entirety. In the following discussion, a general description of the system and its components is provided, followed by a discussion of the operation of the same.

Figure 2:
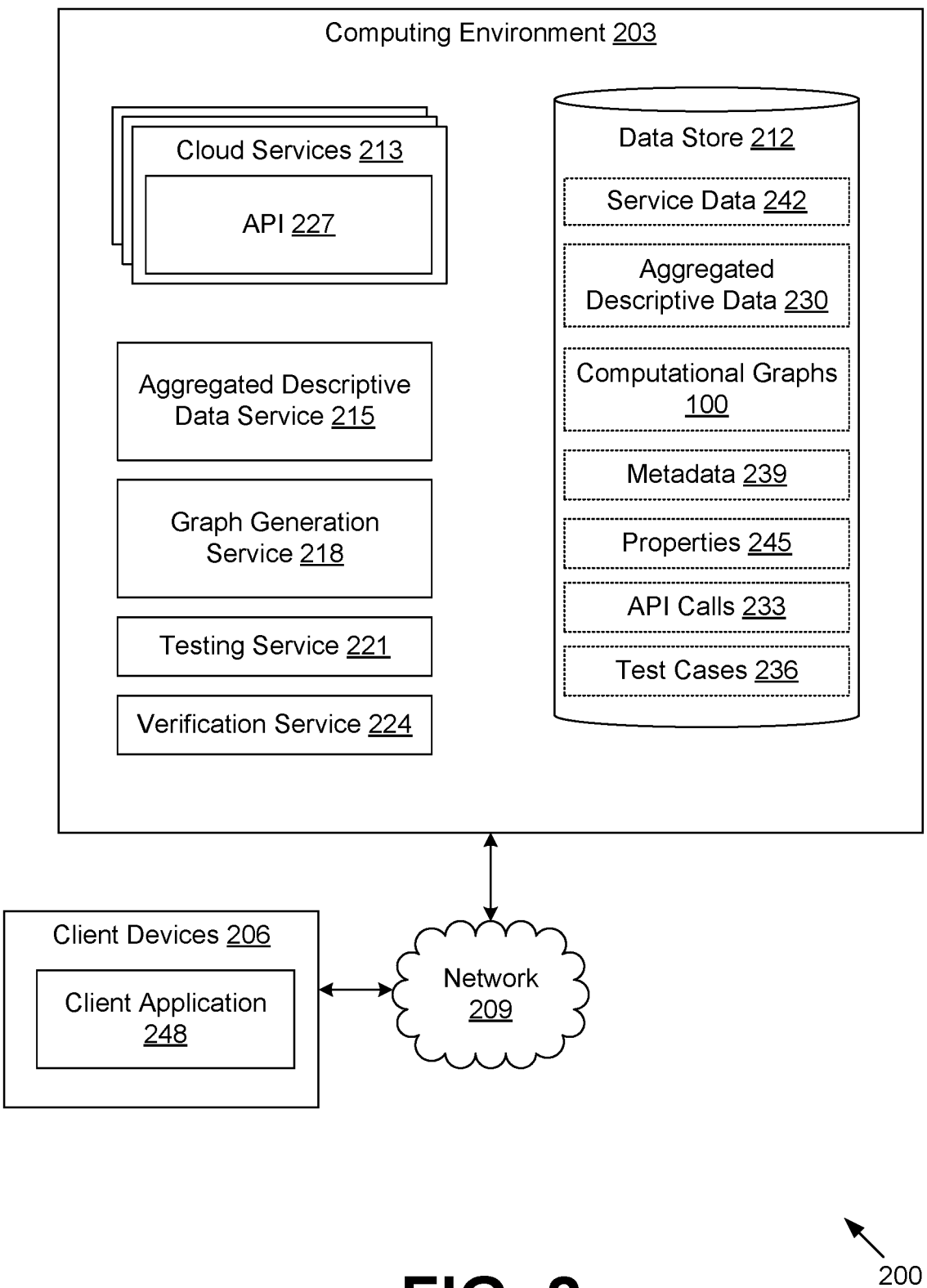
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The networked environment 200 may correspond to a cloud provider network (sometimes referred to simply as a "cloud"), which is a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable loads. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Example regions include U.S. East (located on the east coast of the U.S.), U.S. West (located on the west coast of the U.S.), Europe-London, and Europe-Paris. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) to access resources and services of the cloud provider network. Transit Centers (TC) are the primary backbone locations linking customers to the networked environment 200, and may be co-located at other network provider facilities (e.g., Internet service providers, telecommunications providers). Each region can operate two TCs for redundancy.

Generally, the traffic and operations of a cloud provider network may broadly be subdivided into two categories: control plane operations carried over a logical control plane and data plane operations carried over a logical data plane. While the data plane represents the movement of user data through the networked environment 200, the control plane represents the movement of control signals through the networked environment 200. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

In some embodiments, the computing environment 203 may correspond to a virtualized private network within a physical network comprising virtual machine instances executed on physical computing hardware, e.g., by way of a hypervisor. The virtual machine instances may be given network connectivity by way of virtualized network components enabled by physical network components, such as routers and switches.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include one or more cloud services 213, an aggregated descriptive data service 215, a graph generation service 218, a testing service 221, a verification service 224, and other applications, services, processes, systems, engines, or functionality not discussed in detail herein.

The cloud services 213 may be configured to enable a wide variety of functionality. In various embodiments, the individual cloud services 213 may provide a service that allows customers to dynamically launch and manage physical or virtual machine instances, an eventually consistent data storage service where data is stored in respective buckets, a database service that supports key-value and document data structures, a distributed message queuing service, a workflow management service, and/or other services. Each of the cloud services 213 may be associated with a corresponding application programming interface (API) 227 that supports a set of calls, or operations, that the respective cloud service 213 can perform. In one example, the API 227 may support obtaining descriptive information regarding a customer's allocated computing resources implemented through the respective cloud service 213. This descriptive information may include status information, system health information, performance metrics, and other descriptive information. Making a call to an API 227 may invoke a sequence of many different services or agents 102 (FIG. 1) to perform operations and process data.

The aggregated descriptive data service 215 is executed to receive event updates with descriptive information from the cloud services 213 and to store them as aggregated descriptive data 230 in the data store 212. As such, the aggregated descriptive data service 215 is able to provide a materialized view or durable cache of the descriptive information regarding the cloud services 213, without the need for customers to query descriptive data APIs 227 of the cloud services 213 directly. In various embodiments, the aggregated descriptive data service 215 may query the descriptive data APIs 227 periodically, or the aggregated descriptive data service 215 may receive a stream of updates from the cloud services 213 periodically or in response to a change in status that results in a new event.

The graph generation service 218 is executed to generate computational graphs 100 for APIs 227. The graph generation service 218 may generate the computational graphs 100 based on information regarding previous API calls 233 to a cloud service 213, which may include the input data, output data, and intermediate agents 102 or services used to perform operations to complete the API calls 233. In other embodiments, the graph generation service 218 may generate the computational graphs 100 for the APIs 227 based at least in part on a static analysis that includes a stepwise analysis of all dependencies of the respective API 227, including an analysis of the relationships of the agents and data fields.

The testing service 221 is executed to generate test cases 236 for an API 227 based on inspection of a computational graph 100 generated by the graph generation service 218. In particular, the testing service 221 is able to examine all observed outputs in the computational graph 100 and from that set of outputs, determine a set of representative inputs that would yield all of the observed outputs. Test cases 236 can then be generated from the set of representative inputs. In some embodiments, the testing service 221 may also perform the test cases 236 for the API 227 and report whether the output results are expected, which may be useful, for example, when the code to perform the API 227 has been modified.

The verification service 224 is executed to verify that an API 227 has a specific property. To this end, the verification service 224 may cause the computational graph 100 generated by the graph generation service 218 to be labeled with metadata 239 at individual nodes of the computational graph 100. The verification service 224 may then inspect the computational graph 100 to confirm whether a property holds true for the computational graph 100. As an example, the verification service 224 may confirm that a computational graph 100 for an API 227 adheres to an inter-customer isolation property, such that computing resources allocated to one customer are not used by computing resources allocated to another customer. As another example, the verification service 224 may confirm that a computational graph 100 for an API 227 has an availability zone independence property, such that computing resources that are allocated in a first availability zone do not depend on computing resources in a second availability zone.

The data stored in the data store 212 includes, for example, service data 242, aggregated descriptive data 230, computational graphs 100, metadata 239, properties 245, API calls 233, test cases 236, and potentially other data. The service data 242 may correspond to data stored by various cloud services 213. The service data 242 may be objects stored on behalf of the cloud services 213 and/or intermediate data used by the cloud services 213 to perform operations and/or generate results.

The aggregated descriptive data 230 is a mirror or replica of a current set of descriptive information generated by the cloud services 213. The aggregated descriptive data 230 may indicate status information and/or health information for the respective cloud services 213.

The computational graphs 100 are representations of respective APIs 227 supported by the cloud services 213. Each of the computational graphs 100 is comprised of a plurality of nodes, which may correspond to agents that perform operations or data fields. The nodes may be linked by vertices. In some embodiments, the computational graphs 100 are directed graphs, meaning that the vertices or links are in a specific direction, and without cycles. In some embodiments, the computational graphs 100 may include subgraphs that are without side effects, meaning that performing the operations involved in the subgraph will not change or otherwise modify the subgraph.

The metadata 239 includes data regarding the computing environment 203 in which each of the cloud services 213 is executed. The metadata 239 may describe availability zones, customer identifiers, security vulnerabilities, types of computing hardware, colocation status of customers, measurable performance metrics (e.g., latency, errors, error rates, bugs in kernels, etc.), and/or other information relevant to the computing environment 203.

The properties 245 may correspond to various properties that are desirable for an API call 233. For example, it may be desirable that an API call 233 for one customer not use computing resources allocated to another customer. As another example, it may be desirable that an API call 233 for a cloud service 213 allocated in a first availability zone not use resources from a second availability zone, where a failure in the second availability zone could cause a failure in the API call.

The test cases 236 correspond to representative inputs identified by the testing service 221 for an API 227 through analysis of a computational graph 100. Specifically, the test cases 236 may correspond a set of inputs that when provided to the API 227 are predicted to yield all observed outputs, thereby maximally testing the API 227. It is noted that the set of inputs may be a subset of all observed or possible inputs, as fewer than all of the inputs may be needed to test the observed outputs fully.

The client device 206 is representative of a plurality of client devices that may be coupled to the network 209. The client device 206 may comprise, for example, a processor-based system such as a computer system. Such a computer system may be embodied in the form of a server computer, a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices.

The client device 206 may be configured to execute various applications such as a client application 248 and/or other applications. The client application 248 may be executed in a client device 206, for example, to access network content served up by the computing environment 203 and/or other servers. To this end, the client application 248 may comprise, for example, a service client, a browser, a dedicated application, etc. The client device 206 may be configured to execute applications beyond the client application 248 such as, for example, email applications, social networking applications, word processors, spreadsheets, and/or other applications.

Figure 3:
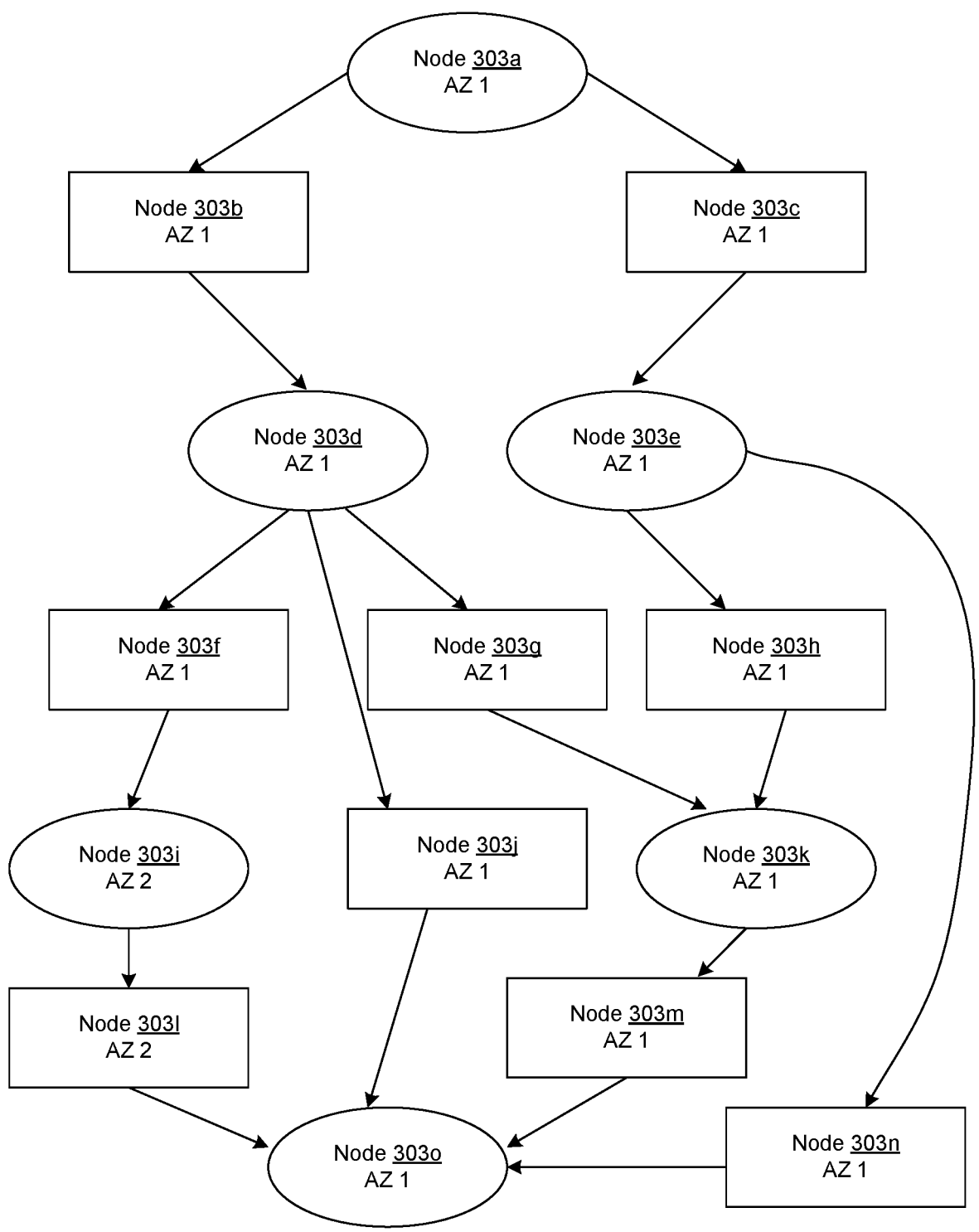
FIG. 3 is a drawing of an example computational graph formed of a plurality of nodes and labeled with metadata according to various embodiments of the present disclosure.

Referring next to FIG. 3, shown is a drawing of an example computational graph 300 formed of a plurality of nodes 303a . . . 303o. The structure of the computational graph 300 is equivalent to that of the example computational graph 100 depicted in FIG. 1. In this example, the nodes 303 have been annotated with respective metadata 239 (FIG. 2), which here corresponds to a respective availability zone in which the node (e.g., the agent or data) is executed or stored. It may be desired that the corresponding API 227 (FIG. 2) have the property 245 (FIG. 2) of using only one availability zone, so that failures in other availability zones will not impact the operation of the cloud service 213 (FIG. 2). However, as can be seen from an inspection of the computational graph 300, the nodes 303i and 303l are associated with availability zone (AZ) 2, while all of the other nodes 303 are associated with AZ 1. Thus, the inspection would indicate that the API 227 does not have the property of availability zone isolation or failure independence.

Figure 4:
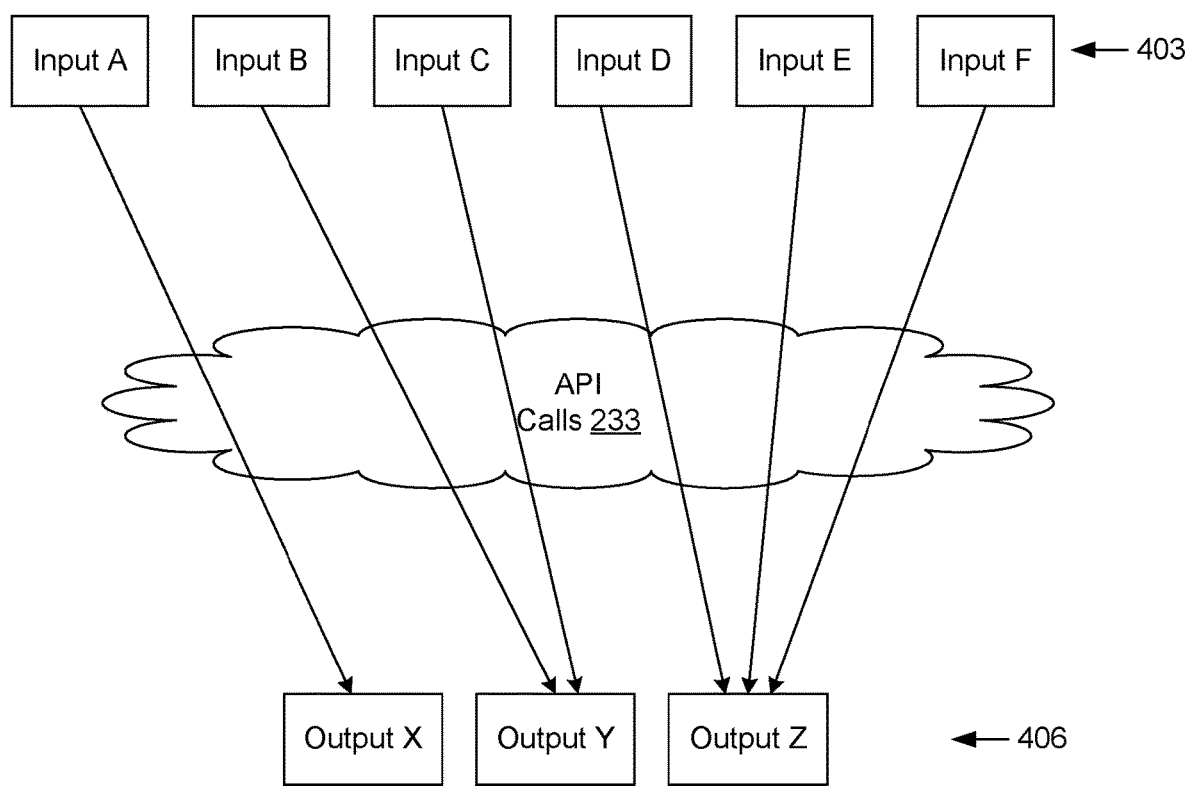
FIG. 4 is a drawing of an example scenario involving a testing service analyzing a computational graph of a cloud service to determine test cases according to various embodiments of the present disclosure.

Turning now to FIG. 4, shown is an example scenario 400 involving a testing service 221 (FIG. 2) analyzing a computational graph 100 (FIG. 2) of a cloud service 213 (FIG. 2) to determine test cases 236 (FIG. 2). In this example, the API calls 233 are used to form a computational graph 100, which has a set of inputs 403 and a set of outputs 406. In this example, intermediate agents and data are omitted from the API calls 233 for simplicity. As can be seen, although there are six different input types identified (i.e., inputs A . . . F), there are only three different output types observed (i.e., outputs X, Y, and Z).

The testing service 221 uses the computational graph 100 to determine a subset of the set of inputs 403 that yields the set of outputs 406. In this case, a representative subset might be input A, B, and D. Of these, input A is chosen to yield output X, input B is chosen to yield output Y, but input C could have been chosen instead, and input D is chosen to yield output Z, but inputs E or F could have been chosen instead. Accordingly, a set of inputs A, B, and D can be used to generate test cases 236 to fully test the API 227 (FIG. 2) of the cloud service 213.

Figure 5:
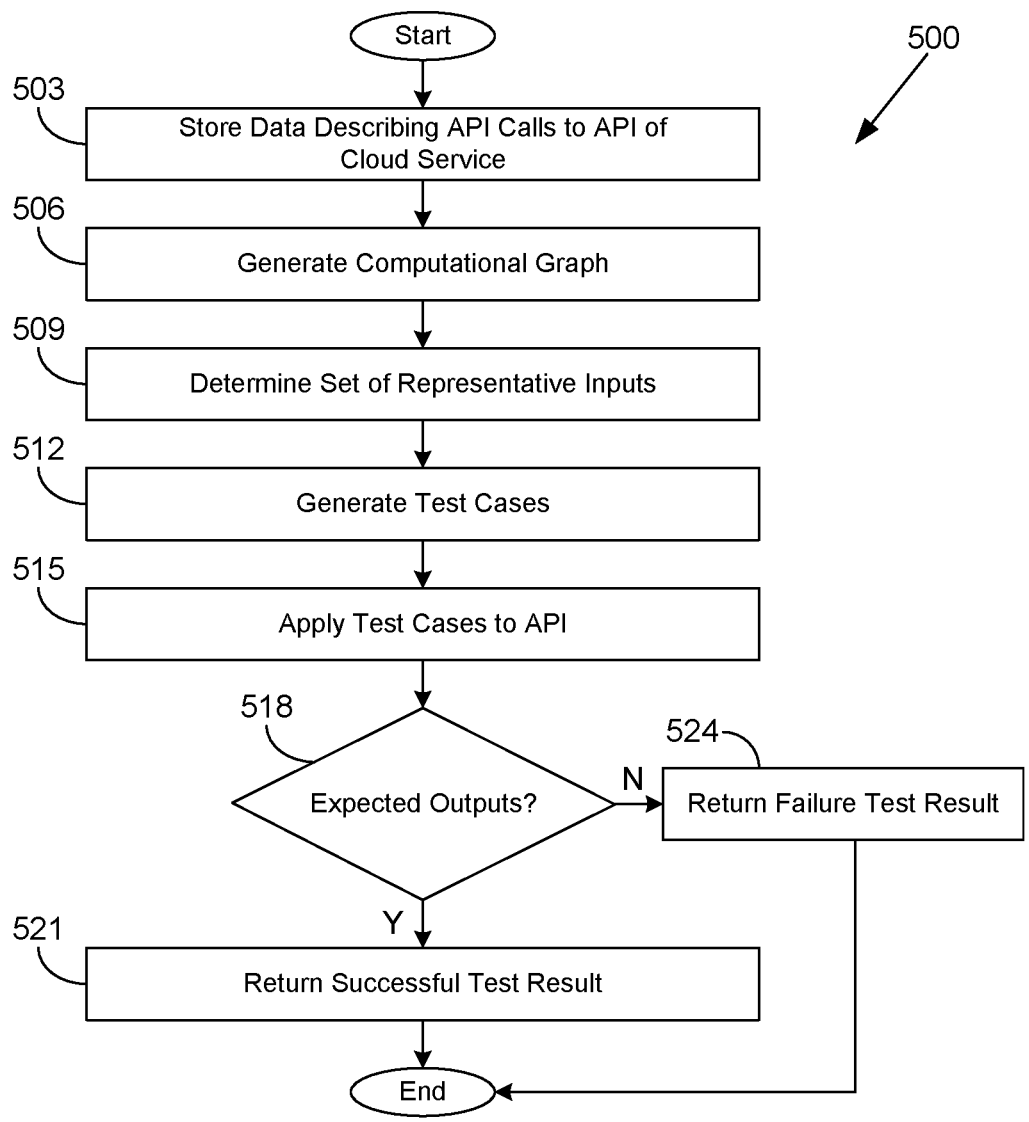
FIG. 5 is a flowchart illustrating one example of functionality implemented as portions of a cloud service, a graph generation service, and a testing service executed in a computing environment in the networked environment of FIG. 2 according to various embodiments of the present disclosure.

Referring next to FIG. 5, shown is a flowchart 500 that provides one example of the operation of portions of the cloud services 213 (FIG. 2), graph generation service 218 (FIG. 2) and the testing service 221 (FIG. 2) according to various embodiments. It is understood that the flowchart 500 provides merely an example of the many different types of functional arrangements that may be employed to implement the operation of the portions of the cloud services 213, the graph generation service 218, and the testing service 221 as described herein. As an alternative, the flowchart 500 may be viewed as depicting an example of elements of a method implemented in the computing environment 203 (FIG. 2) according to one or more embodiments.

Beginning with box 503, the cloud services 213 store data describing API calls 233 (FIG. 2) in the data store 212 (FIG. 2). For example, the cloud services 213 may be instrumented to record a call trace among the various agents that perform operations implementing the API calls 233. The recorded API calls 233 may include the agents invoked as well as the data generated. The data describing the API calls 233 may indicate the respective input data and the respective output data for individual API calls 233. In one embodiment, the API calls 233 may relate to the operation of the aggregated descriptive data service 215 (FIG. 2) as well as descriptive data requests directly though APIs 227 (FIG. 2) of the cloud services 213.

In box 506, the graph generation service 218 generates a computational graph 100 (FIG. 2) from the API calls 233 for the API 227 of the cloud service 213. The computational graph 100 is created to represent the corresponding actions performed by a plurality of agents to complete the API calls 233 for an API function. The computational graph 100 may be regenerated as necessary when changes are made to the API 227. In some cases, the computational graph 100 may be generated based at least in part on a static analysis of the API 227 and its dependencies.

In box 509, the testing service 221 analyzes the computational graph 100 to determine a set of representative inputs that yield the set of observed outputs. It is noted that the set of representative inputs may be a subset of all observed inputs as described with respect to the example of FIG. 4, because all inputs may not be necessary to test the API 227 of the cloud service 213. For example, the analysis may include determining one or more subgraphs of the computational graph 100 that is without side effects. That is to say, the analysis may focus on a particular part of the API 227 that corresponds to a subgraph of the computational graph 100.

In box 512, the testing service 221 generates a plurality of test cases 236 (FIG. 2) for the API 227 based at least in part on analyzing the computational graph 100 and the set of representative inputs. For example, the testing service 221 may record the set of expected outputs that correspond to the set of representative inputs.

In box 515, the testing service 221 applies the test cases 236 to the API 227. This may include performing regression testing. For example, a change may be made to the implementation of the cloud service 213 with respect to the API 227. The testing service 221 can use previously recorded test cases 236 to determine whether the change affects the operation of the cloud service 213, when it may be expected not to have an effect. In some scenarios, alternative versions may be used for comparison instead of old and new versions. In another example, the aggregated descriptive data service 215 may be tested to ensure that the results are the same as reported by the descriptive data APIs 227 of the cloud services 213.

In box 518, the testing service 221 determines whether the expected outputs are observed from the test cases 236. The testing service 221 may also examine the time taken, the resource utilization, and other information regarding the computing environment 203 in which the cloud service 213 is executed while the test cases 236 are being run. If the expected outputs are observed and the environmental parameters are acceptable, the testing service 221 moves from box 518 to box 521 and returns a successful test result. The testing service 221 may also report the environmental parameter values (e.g., time taken, resource utilization, etc.). Thereafter, the operation of the flowchart 500 ends.

If different outputs are observed, errors occur, and/or environmental parameters are out of bounds, the testing service 221 moves instead from box 518 to box 524 and returns a failure test result. The testing service 221 may indicate specifically which inputs did not produce the expected outputs and/or the unexpected outputs that were produced. The testing service 221 may also report environmental parameter values. Thereafter, the operation of the flowchart 500 ends.

In other embodiments, the testing service 221 may employ a differential analysis based on comparing computational graphs 100 generated for different versions of an API 227. For example, the testing service 221 may observe whether the set of representative inputs for a computational graph 100 matches or is equivalent to the set of representative inputs for an updated version or an alternative version of the computational graph 100. The testing service 221 may also observe whether the set of observed outputs for a computational graph 100 matches or is equivalent to the set of observed outputs for an updated version or an alternative version of the computational graph 100.

In some embodiments, manually created test cases 236 may be compared to the automatically generated test cases 236. For example, the testing service 221 may test how many paths of an API 227 are actually executed for the manually created test cases 236 as opposed to the automatically generated test cases 236. Also, in some scenarios, the testing service 221 may inject invariants into the test cases 236 as a source of truth to be tested, rather than performing only a differential analysis.

Figure 6:
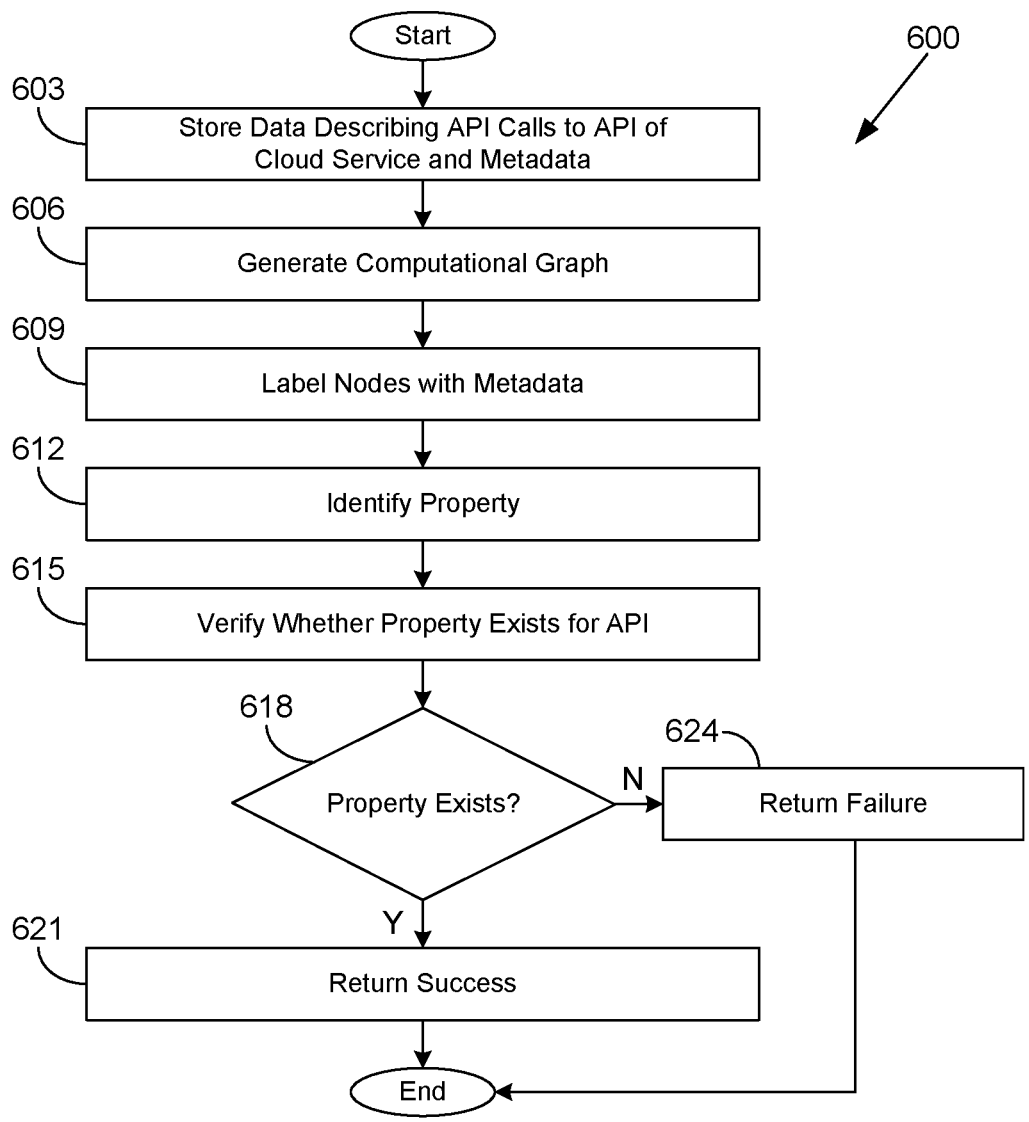
FIG. 6 is a flowchart illustrating one example of functionality implemented as portions of a cloud service, a graph generation service, and a verification service executed in a computing environment in the networked environment of FIG. 2 according to various embodiments of the present disclosure.

Moving on to FIG. 6, shown is a flowchart that provides one example of the operation of the portions of the cloud services 213 (FIG. 2), the graph generation service 218 (FIG. 2) and the verification service 224 (FIG. 2) according to various embodiments. It is understood that the flowchart 600 provides merely an example of the many different types of functional arrangements that may be employed to implement the operation of the portions of the graph generation service 218 and the verification service 224 as described herein. As an alternative, the flowchart 600 may be viewed as depicting an example of elements of a method implemented in the computing environment 203 (FIG. 2) according to one or more embodiments.

Beginning with box 603, the cloud services 213 store data describing API calls 233 (FIG. 2) in the data store 212 (FIG. 2) and corresponding metadata 239 (FIG. 2) describing the computing environment 203 in which actions are executed and data is stored. For example, the cloud services 213 may be instrumented to record a call trace among the various agents that perform operations implementing the API calls 233 and also to record the metadata 239. The recorded API calls 233 may include the agents invoked as well as the data generated. The data describing the API calls 233 may indicate the respective input data and the respective output data for individual API calls 233. In one embodiment, the API calls 233 may relate to the operation of the aggregated descriptive data service 215 (FIG. 2) as well as descriptive data requests directly though APIs 227 (FIG. 2) of the cloud services 213.

In box 606, the graph generation service 218 generates a computational graph 100 (FIG. 2) from the API calls 233 for the API 227 of the cloud service 213. The computational graph 100 is created to represent the corresponding actions performed by a plurality of agents to complete the API calls 233 for an API function. The computational graph 100 may be regenerated as necessary when changes are made to the API 227.

In box 606, the verification service 224 labels the nodes of the computational graph 100 with the corresponding metadata 239 that describes a computing environment 203 in which the corresponding actions for the nodes are executed. For example, if the node corresponds to an action performed by an agent operating in a computing instance owned by a particular customer, the node may be labeled with the customer's identifier. Examples of metadata 239 may include security vulnerabilities, customer identifiers, availability zone identifiers, performance metrics, and so on.

In box 612, the verification service 224 identifies a target property 245 (FIG. 2) that is desired for the API. For example, properties 245 may include inter-customer isolation, independence among availability zones, and security invariants. In some cases, there may be multiple target properties 245.

In box 615, the verification service 224 determines whether the target property 245 exists for each of the nodes of the API 227 based at least in part on an analysis of the computational graph 100 labeled with the metadata 239. In box 618, the verification service 224 determines whether the target property 245 exists for the API 227. For example, for the property 245 to exist, it may be the case that all nodes adhere to the property 245. That is to say, for inter-customer isolation, all nodes are to be associated with the same customer identifier. Alternatively, the property 245 may exist if a threshold number of the nodes adhere to the property 245, or if one or more of the nodes adhere to the property 245, in various scenarios. If the property 245 exists, the verification service 224 moves from box 618 to box 621 and returns a successful result. The verification service 224 may provide a report with the results of the property analysis. Thereafter, the operation of the flowchart 600 ends.

If the property 245 does not exist for the API 227, the verification service 224 moves instead from box 618 to box 624 and returns a failure result. The verification service 224 may provide a report with the results of the property analysis. The verification service 224 may indicate specifically which nodes failed the property 245. For example, the verification service 224 may report that a host has a particular kernel with a security issue, and that all further requests need to avoid this host. Thereafter, the operation of the flowchart 600 ends.

Figure 7:
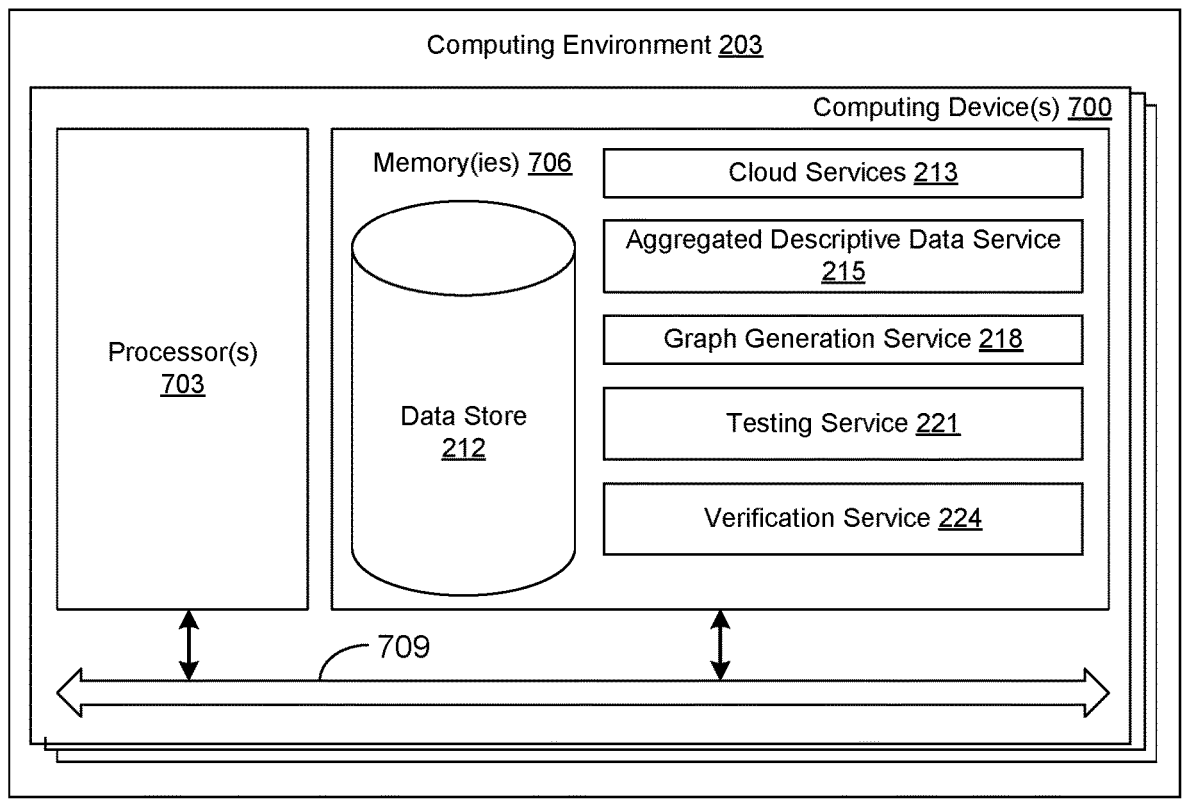
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the cloud services 213, the aggregated descriptive data service 215, the graph generation service 218, the testing service 221, the verification service 224, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the cloud services 213, the aggregated descriptive data service 215, the graph generation service 218, the testing service 221, and the verification service 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 6 show the functionality and operation of an implementation of portions of the cloud services 213, the graph generation service 218, the testing service 221, and the verification service 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the cloud services 213, the aggregated descriptive data service 215, the graph generation service 218, the testing service 221, and the verification service 224, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the cloud services 213, the aggregated descriptive data service 215, the graph generation service 218, the testing service 221, and the verification service 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   generate a computational graph representing corresponding actions performed by a plurality of agents and data associated with the corresponding actions based at least in part on data describing a plurality of calls to an application programming interface (API), the data describing the plurality of calls to the API including respective input data and respective output data for individual ones of the plurality of calls to the API;
   label individual ones of a plurality of nodes of the computational graph with metadata relating to a computing environment in which a respective action of the corresponding actions is executed, the metadata comprising at least one of: a respective availability zone in which the respective action is executed or a customer identifier of a customer for whom the computing environment is operated;
   verify whether a property exists for the API by analyzing the metadata for the individual ones of the plurality of nodes, wherein the property corresponds to at least one of: inter-customer isolation or availability zone independence;
   generate a plurality of test cases for the API by analyzing the computational graph;
   generate an updated version of the computational graph based at least in part on an updated version of the API;
   verify that a first set of representative inputs associated with the computational graph matches a second set of representative inputs associated with the updated version of the computational graph; and
   verify that a first set of observed outputs associated with the computational graph matches a second set of observed outputs associated with the updated version of the computational graph.

2. The non-transitory computer-readable medium of claim 1, wherein the program further causes the at least one computing device to at least determine a subset of representative inputs from the respective input data that yield distinct outputs from the respective output data.

3. A computer-implemented method comprising:
   generating a computational graph representing corresponding actions performed by a plurality of agents and data associated with the corresponding actions based at least in part on data describing a plurality of calls to an application programming interface (API) or a static analysis of the API;

generating a plurality of test cases for the API by analyzing the computational graph;

generating a different version of the computational graph based at least in part on a different version of the API; and verifying at least one of:
that a first set of representative inputs associated with the computational graph matches a second set of representative inputs associated with the different version of the computational graph; or
that a first set of observed outputs associated with the computational graph matches a second set of observed outputs associated with the different version of the computational graph.

4. The computer-implemented method of claim 3 further comprising comparing the plurality of test cases with at least one manually created test case for the API.

5. The computer-implemented method of claim 3 further comprising determining at least one subgraph of the computational graph that is without side effects.

6. The computer-implemented method of claim 3, wherein the data describing the plurality of calls to the API includes respective input data and respective output data for individual ones of the plurality of calls to the API, and generating the plurality of test cases for the API by analyzing the computational graph further comprises determining a subset of representative inputs from the respective input data that yield distinct outputs from the respective output data.

7. The computer-implemented method of claim 3, wherein the plurality of calls to the API provide descriptive information regarding computing resources of a customer of a cloud provider network.

8. The computer-implemented method of claim 3 further comprising:
labeling individual ones of a plurality of nodes of the computational graph with metadata; and
verifying whether a property exists for the API by analyzing the metadata for the individual ones of the plurality of nodes.

9. The computer-implemented method of claim 8, wherein the metadata comprises at least one of: a respective availability zone or a customer identifier.

10. The computer-implemented method of claim 8, wherein the property corresponds to at least one of: inter-customer isolation or availability zone independence.

11. A system comprising:
at least one computing device; and
at least one application executable in the at least one computing device, wherein executing the at least one application causes the at least one computing device to at least:
generate a computational graph representing corresponding actions performed by a plurality of agents and data associated with the corresponding actions based at least in part on data describing a plurality of calls to an application programming interface (API) or a static analysis of the API;
label individual ones of a plurality of nodes of the computational graph with metadata describing a computing environment in which the corresponding actions for the individual ones of the plurality of nodes are executed, the metadata comprising at least one of: a respective availability zone in which the corresponding actions are executed or a customer identifier of a customer for whom the computing environment is operated;
verify whether a property exists for the API by analyzing the metadata for the individual ones of the plurality of nodes, wherein the property corresponds to at least one of: inter-customer isolation or availability zone independence;
generate a different version of the computational graph based at least in part on a different version of the API; and
verify at least one of:
that a first set of representative inputs associated with the computational graph matches a second set of representative inputs associated with the different version of the computational graph; or
that a first set of observed outputs associated with the computational graph matches a second set of observed outputs associated with the different version of the computational graph.

12. The system of claim 11, wherein the metadata describes one or more security vulnerabilities associated with the computing environment.

13. The system of claim 11, wherein the metadata describes one or more performance metrics associated with the computing environment.

14. The system of claim 11, wherein executing the at least one application further causes the at least one computing device to at least generate a plurality of test cases for the API by analyzing the computational graph.

15. The system of claim 14, wherein executing the at least one application further causes the at least one computing device to at least compare the plurality of test cases with at least one manually created test case for the API.

16. The system of claim 11, wherein executing the at least one application further causes the at least one computing device to at least determine at least one subgraph of the computational graph that is without side effects.

17. The system of claim 11, wherein the data describing the plurality of calls to the API includes respective input data and respective output data for individual ones of the plurality of calls to the API, and executing the at least one application further causes the at least one computing device to at least determine a subset of representative inputs from the respective input data that yield distinct outputs from the respective output data.

18. The system of claim 11, wherein the plurality of calls to the API provide descriptive information regarding computing resources of a customer of a cloud provider network.

\* \* \* \* \*